US010617961B2

(12) United States Patent
Ma et al.

(10) Patent No.: US 10,617,961 B2
(45) Date of Patent: Apr. 14, 2020

(54) ONLINE LEARNING SIMULATOR USING MACHINE LEARNING

(71) Applicant: Interlake Research, LLC, Bellevue, WA (US)

(72) Inventors: Yanjun Ma, Bellevue, WA (US); Christine K. Ma, Bellevue, WA (US); Kevin L. Ma, Bellevue, WA (US)

(73) Assignee: Interlake Research, LLC, Bellevue, WA (US)

( * ) Notice: Subject to any disclaimer, the term of this patent is extended or adjusted under 35 U.S.C. 154(b) by 209 days.

(21) Appl. No.: 15/968,780

(22) Filed: May 2, 2018

(65) Prior Publication Data

US 2018/0318719 A1 Nov. 8, 2018

Related U.S. Application Data

(60) Provisional application No. 62/502,746, filed on May 7, 2017.

(51) Int. Cl.
*A63F 13/825* (2014.01)
*A63F 13/213* (2014.01)
(Continued)

(52) U.S. Cl.
CPC .......... *A63F 13/825* (2014.09); *A63F 13/215* (2014.09); *A63F 13/424* (2014.09);
(Continued)

(58) Field of Classification Search
CPC .... A63F 13/825; A63F 13/215; A63F 13/424; A63F 13/44; A63F 13/58; A63F 13/65;
(Continued)

(56) References Cited

U.S. PATENT DOCUMENTS 5,830,067 A * 11/1998 Graves ................... G07F 17/32
463/40
6,024,643 A * 2/2000 Begis ..................... A63F 13/12
463/42
(Continued)

*Primary Examiner* — David L Lewis
*Assistant Examiner* — Matthew D Hoel
(74) *Attorney, Agent, or Firm* — Hertzberg, Turk & Associates, LLC

(57) ABSTRACT

Technologies for executing a virtual character development application using machine learning are described herein. In typical simulation applications, a user may be enabled to create a virtual character and navigate a virtual world. A typical simulation application may accept inputs from the user, determine actions initiated by the user based on the inputs, determine subsequent outcomes of the user initiated actions, and mold the simulation according to the outcomes. However most outcomes may be predetermined and predictable by design. In contrast, some embodiments may include a server configured to execute a virtual character development application in conjunction with one or more client devices. A user may utilize a client device to create and develop a virtual character within the application. The user may be enabled to provide inputs to the virtual character development application, and the artificial component may process the input and extract information associated with the virtual character.

20 Claims, 8 Drawing Sheets

(51) Int. Cl.

| | | |
|---|---|---|
| *A63F 13/215* | (2014.01) | |
| *A63F 13/424* | (2014.01) | |
| *A63F 13/44* | (2014.01) | |
| *A63F 13/58* | (2014.01) | |
| *A63F 13/67* | (2014.01) | |
| *A63F 13/847* | (2014.01) | |
| *G06F 9/451* | (2018.01) | |
| *G06N 99/00* | (2019.01) | |
| *G06Q 30/06* | (2012.01) | |
| *G06N 20/00* | (2019.01) | |
| *A63F 13/65* | (2014.01) | |
| *G06N 3/08* | (2006.01) | |
| *G06N 3/00* | (2006.01) | |
| *G06N 3/04* | (2006.01) | |

(52) U.S. Cl.
CPC .............. *A63F 13/44* (2014.09); *A63F 13/58* (2014.09); *A63F 13/65* (2014.09); *A63F 13/67* (2014.09); *A63F 13/847* (2014.09); *G06F 9/451* (2018.02); *G06N 3/006* (2013.01); *G06N 3/04* (2013.01); *G06N 3/08* (2013.01); *G06N 20/00* (2019.01); *G06Q 30/0641* (2013.01); *A63F 13/213* (2014.09)

(58) Field of Classification Search
CPC ...... A63F 13/67; A63F 13/847; A63F 13/213; G06F 9/451; G06N 20/00; G06N 3/006; G06N 3/04; G06N 3/08; G06Q 30/0641
See application file for complete search history.

(56) References Cited

U.S. PATENT DOCUMENTS

| | | | | |
|---|---|---|---|---|
| 6,106,395 | A  * | 8/2000 | Begis | A63F 13/12 |
| | | | | 463/23 |
| 6,306,038 | B1 * | 10/2001 | Graves | G07F 17/32 |
| | | | | 273/269 |
| 8,683,354 | B2 * | 3/2014 | Khandelwal | H04N 21/25891 |
| | | | | 715/757 |
| 8,923,507 | B2 * | 12/2014 | Chang | H04M 1/274558 |
| | | | | 379/368 |
| 9,908,046 | B2 * | 3/2018 | Dawson | A63F 13/12 |
| 10,252,160 | B2 * | 4/2019 | Dawson | A63F 13/12 |
| 2018/0104585 | A1 * | 4/2018 | Dawson | A63F 13/12 |
| 2018/0165596 | A1 * | 6/2018 | Abrams | G06N 20/00 |

* cited by examiner

US 10,617,961 B2

ONLINE LEARNING SIMULATOR USING MACHINE LEARNING

CROSS REFERENCE TO RELATED APPLICATIONS

This application claims the benefit of U.S. Provisional Patent Application Ser. No. 62/502,746 filed on May 7, 2017. The disclosures of the above applications are hereby incorporated by reference for all purposes.

BACKGROUND

Unless otherwise indicated herein, the materials described in this section are not prior art to the claims in this application and are not admitted to be prior art by inclusion in this section.

In typical simulation applications, a user may be enabled to create a virtual character and navigate a virtual world. A typical simulation application may accept inputs from the user, determine actions initiated by the user based on the inputs, determine subsequent outcomes of the user initiated actions, and mold the simulation according to the outcomes. Most outcomes it in the simulations are predetermined, and the simulation is designed to direct the user to accomplish a goal.

SUMMARY

The present disclosure generally describes techniques for executing a virtual character development application using machine learning.

According to some embodiments, a system may be configured to execute an application for virtual character development. The system may comprise a server that includes an artificial intelligence (AI) component capable of machine learning and a client device configured to communicate with the server. The client device, in conjunction with the seater, may be configured to allow a user to create a virtual character, store information associated with the virtual character at the server, and provide a user interface (UI) to allow the user to interact the virtual character through an input. The information associated with the virtual character may be provided to the AI component. The AI component may be configured to receive an input from a user associated with a virtual character, extract information from the received input, update the information associated with the virtual character based on the extracted information, and provide an interactive response to the input through the virtual character.

According to other embodiments, a server may be configured to execute a virtual character development application. The server comprising a communication interface configured to provide communication between the server and a plurality of client devices, a memory configured to store instructions associated with a virtual character development application, and one or more processors coupled to the communication interface and the memory. The processor may be configured to receive an input from a user associated with a virtual character, execute an artificial intelligence engine to extract information from the received input, update information associated with the virtual character based on the extracted information, and provide, to a client device, an interactive response to the input through the virtual character.

According to further embodiments, a method of simulating a virtual character may comprise creating a virtual character through an application executed on a client device, receiving an input from a user through one or more input devices to communicate with the virtual character, executing an artificial intelligence engine to extract information from the received input, updating information associated with the virtual character based on the extracted information, and providing an interactive response to the input through the virtual character.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
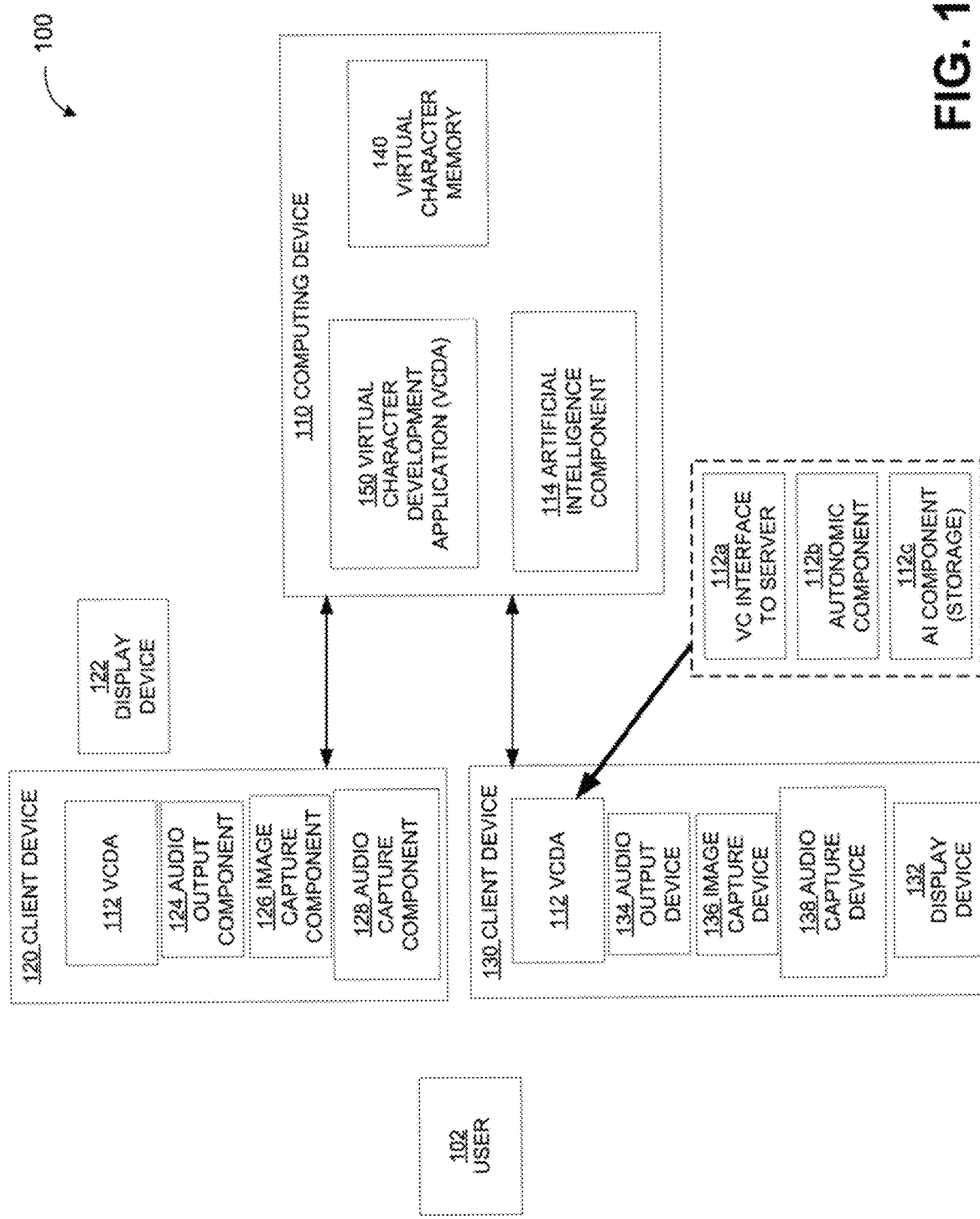
FIG. 1 includes a conceptual illustration of an example system configured to execute an online teaching simulator using machine learning.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to executing a virtual character development application using machine learning.

Briefly stated, technologies are generally described to execute a virtual character development application using artificial intelligence, including machine learning. A server may execute a virtual character development application in conjunction with one or more client devices. A user may utilize a client device, to create a virtual character and develop the virtual character within the application. The virtual character may have an autonomic component (similar to the physical body of a human) and an artificial intelligent part (similar to the brain of a person). The autonomic component may provide natural, timed growth for the character. The artificial intelligent part of the virtual character may be taught or trained by the user. The user may be enabled to provide inputs to the virtual character development application. The server may provide an artificial intelligence processing module, including machine learning, algorithms and platform for the use to train the artificial part of his virtual character. The server may process the input and extract information to build a machine learning model for the artificial intelligent part of the virtual character. The server may update the stored model associated with the virtual character based on the extracted information. The user may play with his created virtual character by himself or with other characters created by other users.

FIG. 1 includes a conceptual illustration of an example system configured to execute a virtual character development application using machine learning, arranged in accordance with at least some embodiments described herein.

As shown in diagram 100, a server 110 may execute a virtual character development application 150. The virtual character development application 150 may be a simulation application that enables a user to create a plurality of virtual characters, communicate with the plurality of virtual characters, and perform activities with the plurality of virtual characters within a simulated environment. The server 110 may execute the virtual character development application in conjunction with a first client device 120 and a second client device 130, which both may belong to the user 102. For example, the client devices may be one of be a variety of general purpose or special purpose computing devices such as desktop computer, laptop computer, mobile computer, smart phone, wearable computer, smart glass, virtual reality, augmented reality or mixed reality devices or game console.

The first client device 120 may include an audio output component 124, an image capture component 126, and an audio capture component 128. The first client device 120 may also execute a virtual character development application 112. The virtual character development application. 112 may be a locally installed application communicatively coupled to the virtual character development application 150 at the server or a browser that allows access to the virtual character development application 150. The audio output component 124 may be one of a pair of speakers, headphones, a wired headset, a wireless headset or a stereo system. The image capture component 126 may be a camera that may be accessed by the virtual character development application 112. The audio capture component 128 may be a microphone or a plurality of microphones that may be accessed by the virtual character development application 112. The first client device 120 may be connected to a display device 122, which may be a television, a projector, a monitor, or mobile device. Similarly, the second client device may execute the virtual character development application 112 and may include an audio output component 134, an image capture component 136, an audio capture component 138, as well as a display device 132, which may be integrated with the second client device 130. For example, the first client device 120 may be a gaming console that has an integrated microphone, camera, and speakers and may be connected to a television. The second client device 130 may be a mobile device, such as a cellphone, that has an integrated microphone, camera, speaker, and display.

The user 102 may use either device to exeunt the virtual character development application 112. In the example scenario, the user 102 may use the first client device 120 to initiate the virtual character development application 112 in conjunction with the server 110. Using the virtual character development application 112, the user 102 may create a virtual character within a simulated environment. The virtual character development application 112 on the client device 120 may comprise an autonomic component 112b, an artificial intelligent component 112c, and an interface component 112a that communicates with the server, for example with the artificial intelligence component 114 on the server 110.

The autonomic component 112b may resemble that of animal autonomic functions such as a virtual biologic clock, the need for food, drink, going to bath, which may require periodic attention of the user to take care of his virtual character during the growth phase. For example, the character may resemble a new born baby that requires periodic feeding, bathing, and cleanup. These tasks may be predetermined and set on a fixed time frame.

Examples of artificial intelligence component 114 ma be artificial intelligent algorithms or machine learning algorithms located on the server 110. The artificial intelligence component 114 may create a memory for the virtual character 140 to store information associated with the virtual character. For example, the memory may store the machine learning model of the artificial intelligent part of the virtual character. Examples of artificial intelligent components or modules may include neural networks and deep neural networks, such as convolutional neural network for image recognition, and recurrent neural network for speech recognition, or a combination of different neural networks.

In order to develop the virtual character, the user 102 may reach the virtual character by providing information using the audio capture component 124, the image capture component 126, or by uploading media, such as audio files, images, or videos, among other things. The user 102 may choose to teach the virtual character about one specific subject or a variety of subjects such as music, specific songs, drawings, games, logic, problem-solving skills, vocabulary, letters, numbers, or arithmetic operations, among other things, using the technology generally called supervised learning. For example, the user 102 may upload a photo to the virtual character development application 112 using the image capture component 126, such as the camera in the example scenario. The virtual character development application 112 may perform a pre-processing of the image, including encrypting, and then transmit the image, through the interface component 112a, to the artificial intelligence component 114 to be processed on server 110. The artificial intelligence component 140 may be capable of analyzing many types of inputs through character recognition, image recognition, or voice recognition, for example, using neural networks such as recurrent neural network for Voice recognition or convolutional neural network for image processing, among other techniques. The artificial intelligence component 114 may extract essential features from the image and store extracted information in the virtual character's memory 140. For example, if the image is of a dog, the artificial intelligence component 140 may extract the color and geometric shape of the dog and store these parameters in the virtual character's memory 140. Alongside the image, a user 102 may dictate to the virtual character that the image contains a dog using the audio capture component 128, which may be a microphone. The artificial intelligence component 140 may then store the extracted information, the color and geometric shape of the dog in the image, with the dictated term "dog". All example of the stored information is the neural network model parameter associated with dog. This above is generally called the training of the artificial or machine learning model of the virtual character. In particular, the user deploys the supervised learning method to train the virtual character and stored the model parameters in the dedicated memory space associated with virtual character.

Periodically, the user 102 may test the virtual character's knowledge to determine if the virtual character has learned the previously input information or if more teaching is necessary. The user 102 may prompt the virtual character by dictating a question using the audio capture component 128 and/or the image capture component 126. Continuing with the previous example, the user 102 may provide a picture of a dog using the image capture component 126, a camera, and dictating the question "What kind of animal is this?" to the virtual character using the audio capture component 128, or by typing the question. The virtual character development application 112 may transmit the image along with the question to the artificial intelligence component 114. The artificial intelligence component 114 may analyze the question to determine what information needs to be provided and may analyze the image to provide a best answer based on information stored in the virtual character's memory 140. The provided answer may be text, an audio file, another image, or a video, among other things. The artificial intelligence component 114 may provide the answer in the form of an audio clip of a sentence, such as "This picture contains a brown dog," to the virtual character development, application 112. The virtual character development application 112 may prompt the virtual character to respond to the user 102 and may then access the audio output component 124 to provide the answer to the user 102. For example, the virtual character development application 112 may play the audio clip of the sentence over the audio output component 124 in order to allow the virtual character to communicate with the user.

In typical simulation applications, a user may be enabled to create a virtual character and navigate a virtual world. A typical simulation application may accept inputs from the user, determine actions initiated by the user based on the inputs, determine subsequent outcomes of the user initiated actions, and mold the simulation according to the outcomes. Most outcomes within the simulations are predetermined, and the simulation is designed to direct the user to accomplish a goal. In contrast, embodiments described herein include an artificial intelligence component, which may allow the user to develop the character as they choose. Executing a virtual character development application using machine learning may create a more dynamic experience for a user utilizing such an application and may provide a medium for studying teaching techniques.

Figure 2:
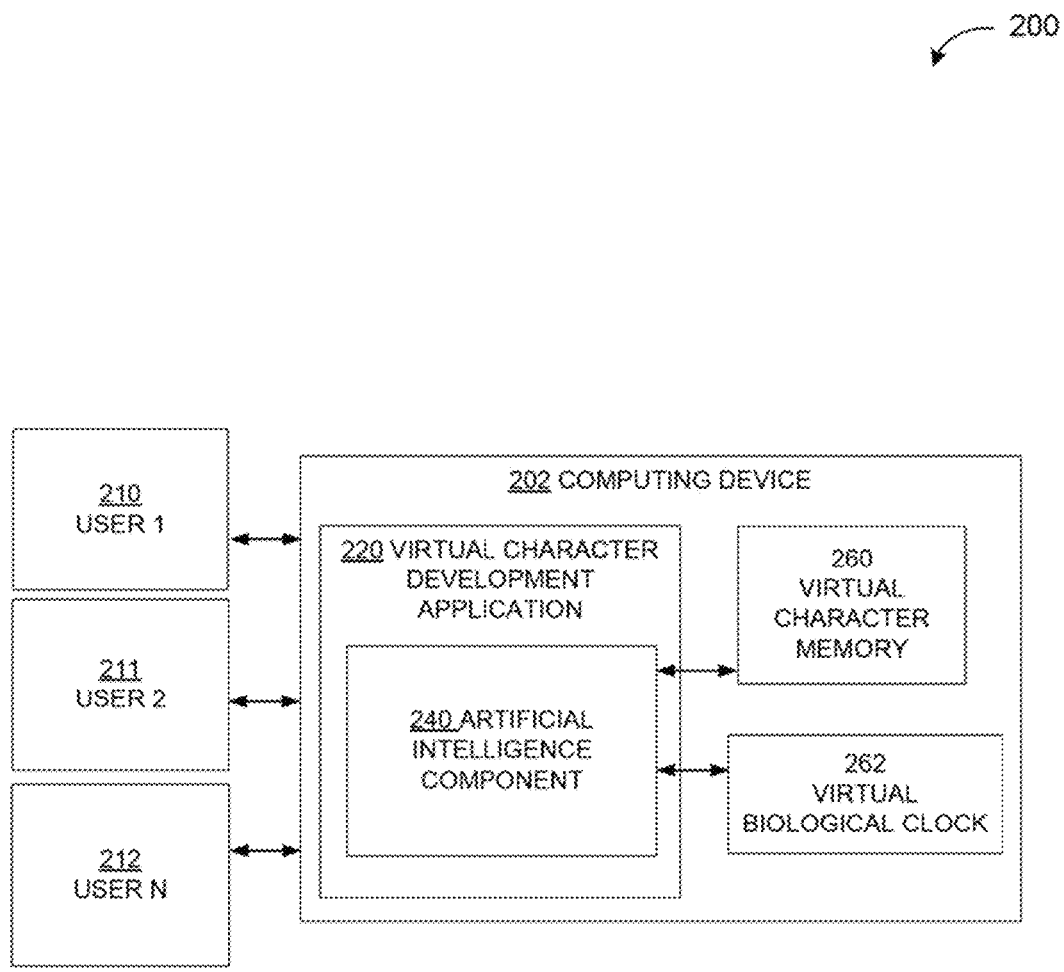
FIG. 2 includes a conceptual illustration of an example system configured to enable multiple users to create and interact with a plurality of virtual characters.

FIG. 2 includes a conceptual illustration of an example system configured to enable multiple users to create and interact with a plurality of virtual characters, arranged in accordance with at least some embodiments described herein, forming a community of virtual characters.

As shown in diagram 200, a server 202 may be configured to, execute a virtual character development application 220 using machine. The virtual character development application 204 may work in conjunction with an artificial intelligence component 240 to create a plurality of virtual characters associated with a first user 210, a second user 211, and a third user 212. The artificial intelligence component 240 may store the memory for each virtual character in the virtual character memory 260 and may create a virtual biological clock 262 for the virtual character. For example, the first user 210 may create a new virtual character using a client device, such as a desktop computer. In order to create the virtual character, the virtual character development application 220 ma prompt the first user 210, via the client device, to choose a role for the virtual character, such as baby, child, or a teenager. The first user 210 may also be prompted by the virtual development application 220 to choose the role for themselves in the simulation such as a sibling, parent, friend, or teacher. For example, the first user 210 may create a virtual character that is a baby and may choose to be the parent of the virtual character.

As time progresses in the virtual character development application 220, the virtual biological clock 262 may generate needs for the virtual character, such as feeding, bathing, sleeping, learning, or entertaining. In the example scenario, the virtual biological clock 262 may track the last time the virtual character, a baby, was fed. After a substantial amount of time passes within the simulation, the virtual biological clock 262 may indicate to the artificial intelligence component 240 that the virtual character needs to eat. The artificial intelligence component 240 may convey this to the first user 210 by prompting the virtual character scream and cry. The first user 210 may recognize this cue and feed the virtual character. The first user may also perform a number of other activities with the virtual character such as, bathing, sleeping, teaching, using a bathroom, or entertaining the virtual character.

The first user 210 may communicate with the virtual character in order tri teach the virtual character a new skill or about a particular subject. The first user 210 may communicate with the virtual character by providing information using an audio capture component of the client device, such as a microphone, an image capture component of the client device, such as a camera, entering information typographically, or by uploading media, such as audio files, images, or videos. For example, the first user 210 may teach the virtual character basic words by dictating words like "mama" and "papa" to the virtual character via the audio capture component. The, artificial intelligence component 240 may process inputs such as these basic words, and extract information using voice recognition, character recognition, or image recognition. The extracted information may then be stored in the virtual character's memory 260 and may be utilized by the artificial intelligence component 240. For example, after the virtual character was taught to speak by the first user 210 and the virtual biological clock 262 indicated that the virtual character needed to be fed, the artificial intelligence component 240 may prompt the virtual character to ask the first user 210 for food rather than screaming and crying.

The first user 210 may also grant permission to the second user 211 and the third user 212 to interact with the virtual character and assist in the development of the virtual character. The second user 211 and the third user 212 may be prompted by the virtual character development application 220 to choose a role within the simulation. For example, the second user 211 may choose to be a friend of the virtual character, and the third user 212 may choose to be the virtual character's teacher. The second user 211 and the third user 212 may interact with the virtual character using similar methods to the first user 210. The second user 211 and the third user 212 may each decide to teach the virtual character a new subject. In the example scenario, the third user 212 may decide that the virtual character needs to learn basic math skills. The third user 212 may upload images of flash cards with each number and dictate to the virtual character, via an audio capture component, which number is on each flash card. The artificial intelligence component 240 may process each input and extract information to be stored in the virtual character's memory 260. The first user 210 may test the virtual character's knowledge of numbers by taking an image of the number three and dictating the question, "What number is this?", to the virtual character, via an audio capture component. The artificial intelligence component 240 may recognize entered phrase is a question and that a number needs to be presented to the first user 210. The artificial intelligence component 240 may extract information from the image using image recognition and associate it with a similar pattern to the three on the flash card. The artificial intelligence component 240 may then prompt the virtual character to reply, "That's a three."

Figure 3:
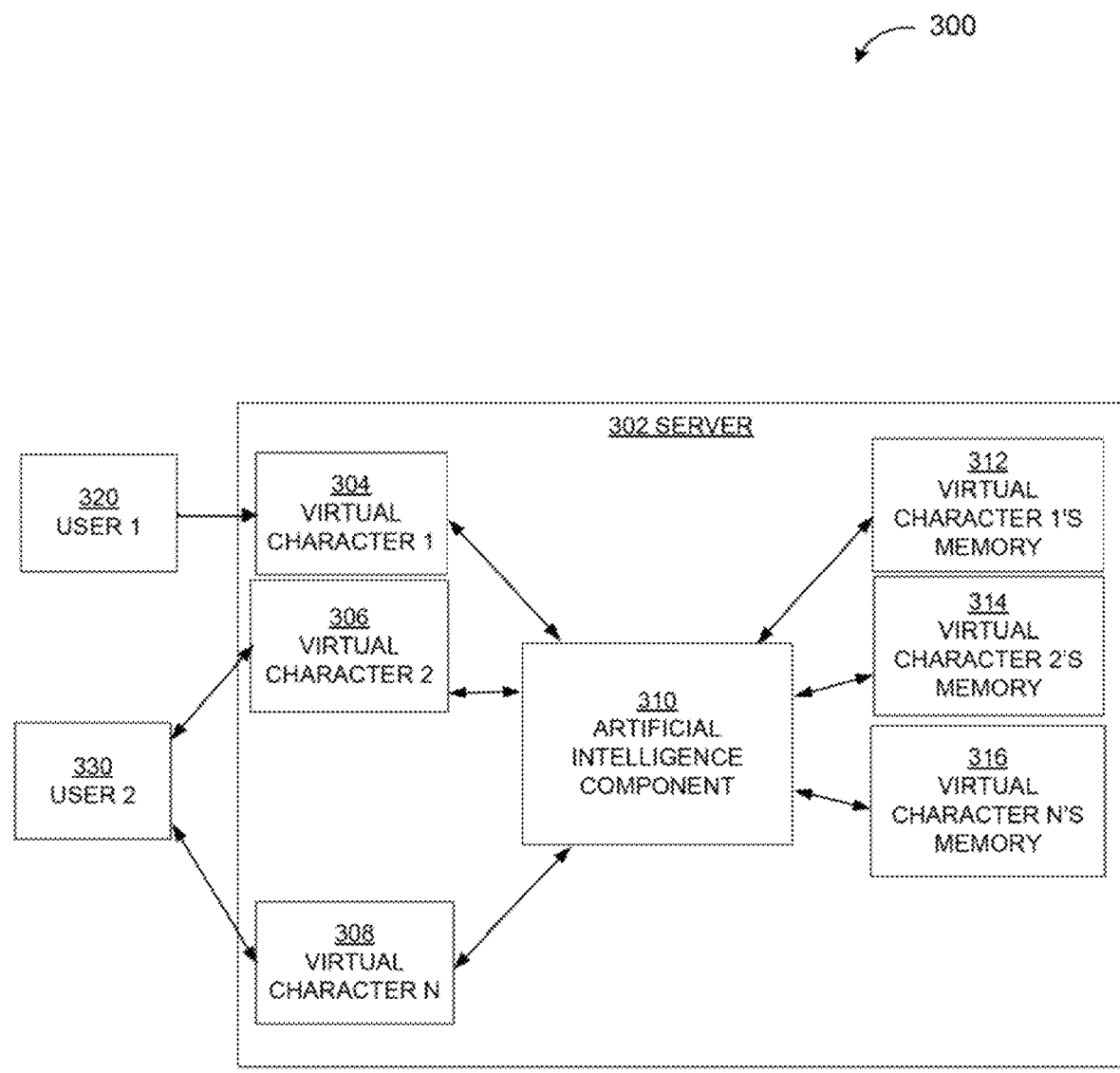
FIG. 3 illustrates major components of an example system configured to enable multiple users to develop multiple virtual characters.

FIG. 3 illustrates major components of an example system configured to enable multiple users to develop multiple virtual characters arranged in accordance with at least some embodiments described herein.

As shown in diagram 300, a server 302 may execute a virtual character development application using machine learning in conjunction with one or more client devices associated with a first user 320 and a second user 330. The virtual character development application may include an artificial intelligence component 310 to enable a plurality of virtual characters to learn new information in a simulated environment. For example, the first user 320 may create a first virtual character 304 and may choose a child role for the newly created virtual character. The first user 320 may choose to be a parent to the first virtual character and may teach the character about a variety of subjects such as music, songs, drawings, games, logics, problem-solving skills, vocabulary, letters, numbers, or arithmetic operations. The first user 320 may provide the information to the first virtual character using an audio capture component of the associated client device, such as a microphone, an image capture component of the associated client device, such as a camera, entering information typographically, or by uploading media, such as audio files, images, or videos.

The first user 320 may grant permission to the second user 330 to interact and communicate with the first virtual character 304. In the example scenario, the second user 330 may have previously chosen the role of teacher within the virtual character development application and may also interact and communicate with a second virtual character 306 and an nth virtual character 308. Using similar methods to the first user 320, the second user 330 may provide information to the plurality of virtual characters in order to teach the virtual characters new information or new skills. For example, the second user 330 may teach the first virtual character 304, the second virtual character 306, and the nth virtual character 308 how to spell more complex words. The second user 330 may enter a list of words using a keyboard or virtual keyboard and may speak to the virtual characters using an audio capture component, such as a microphone, to demonstrate how to spell each word. For example, one of the words may be "Aardvark", and the second user may say to the virtual characters, via the audio capture component, "Aardvark is spelled A-A-R-D-V-A-R-K." The virtual character development application may provide the inputs to the artificial intelligence component 310. The artificial intelligence component 310 may then extract information from the inputs using Voice recognition, character recognition, or image recognition and may update each virtual character's memory accordingly. For example, the first virtual character 304 may have previously been taught how to spell aardvark, so the artificial intelligence component 310 may determine that no updates need to be made to the first virtual character's memory 312 based on the input.

After teaching the group of virtual characters how to spell, the second user 330 may decide to hold an intelligence competition, such as a spelling bee, to see which virtual character is the best at spelling. For example, the second user 330 may ask each virtual character to spell a particular word and may eliminate a virtual character from the intelligence competition if the virtual character answers incorrectly. The first user 320 or the second user 330 may engage the virtual characters in a variety of intelligence competitions to gauge how each virtual character has developed and processed the information that was presented. The intelligence competitions may be based on a determined intelligence level provided by the artificial intelligence component 310. The artificial intelligence component 310 may determine an intelligence level for each virtual character based on information stored in the virtual character's memory.

Figure 4:
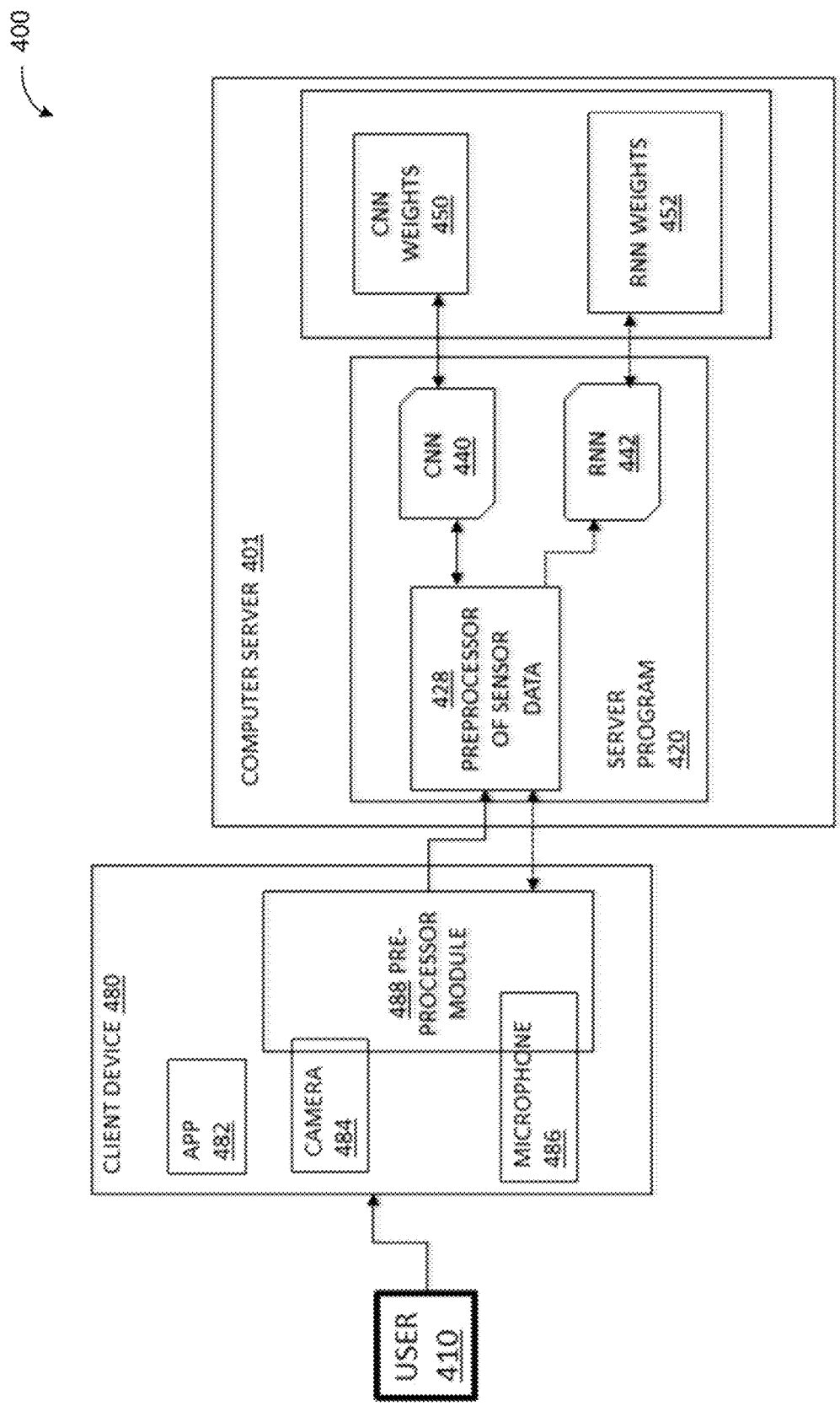
FIG. 4 is a diagram of an example implementation.

FIG. 4 illustrates an exemplary implementation of the system. In the example implementation of diagram 400, the user 410 may supply an image using the camera module 484 on the client device 480, or supply an audio clip using the microphone module 486 on the client device 480. The data are then pre-processed using pre-processing module 488 and transmitted to the computer server 401. The data are pre-processed at the server using a pre-processor of sensor data module 428 of server program 420. The image data may be processed with an image recognition module, such as by a convolutional neural network (CNN) 440 while voice recognition is processed using voice recognition module using a recurrent neural network (RNN) 442. The model parameters, e.g. the weights of the CNN, are stored in the virtual character's virtual memory space on the server 401 or in a storage device connected to the server 401. For example, the RNN model may reside in memory space 452 and the CNN model may reside in memory space 450, allocated to each virtual character. In the training phase, the user may train the image recognition capability of the virtual character by taking picture of the object, through a training app 482 and the camera. As more pictures or videos are shown, the image recognition ability of the virtual character may improve. A similar process may be used to train the voice recognition ability of the virtual character.

The above illustrate the visual and auditory functions of the virtual character. Other sensor modules may also be incorporated into the client device to allow the sense of touch (haptic), smell (olfactory), and taste be taught to the virtual character.

As fully functioning machine learning models typically need large amount of data to train, pre-trained models may be provided. The pre-trained models odes are used as the starting point The user may provide new data to refine the model. For example, a pre-trained image recognition model may be provided that can recognize basic categories of animals and things. The user may then train the model to recognize individual people, such as relatives of the user.

Figure 5:
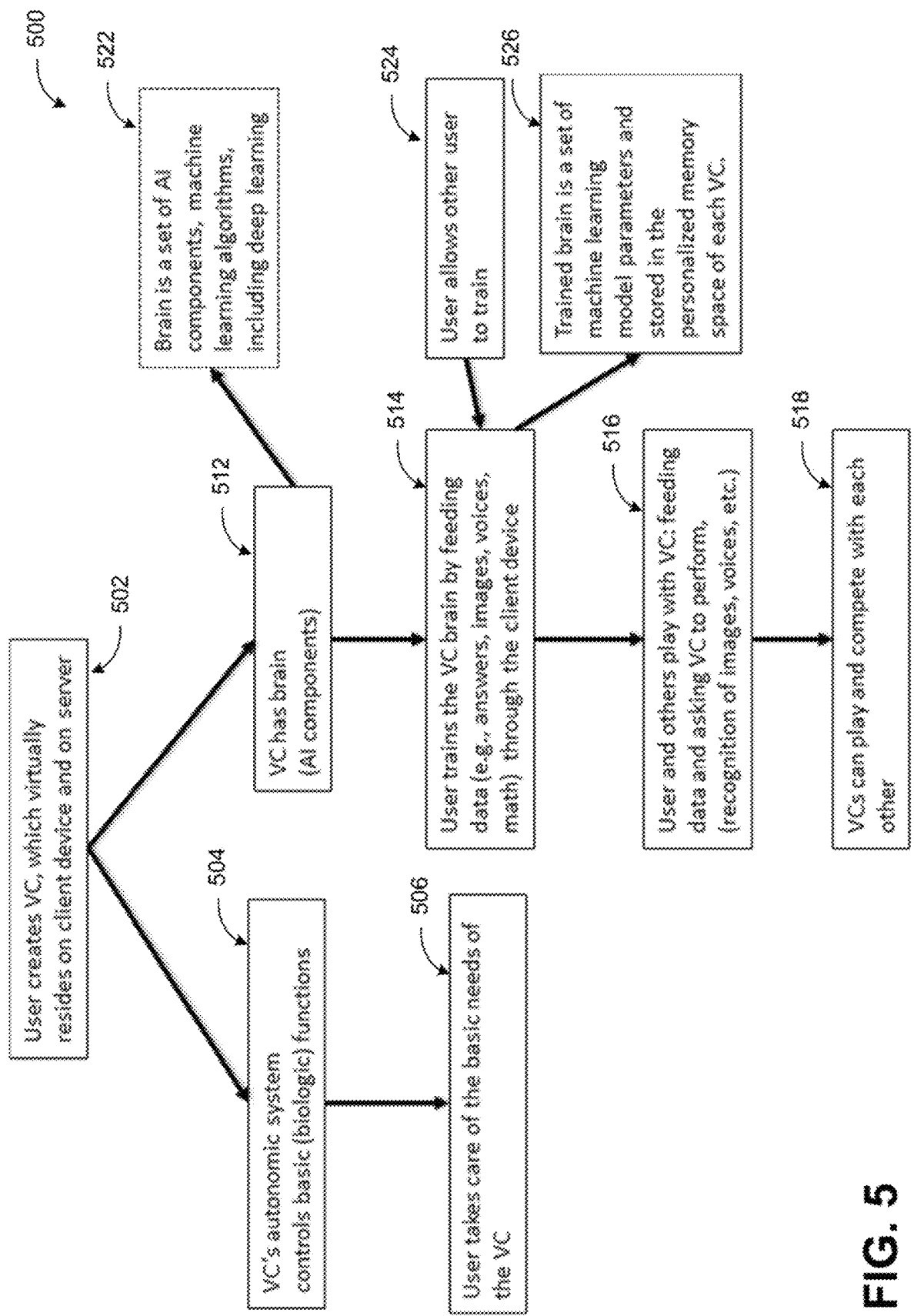
FIG. 5 is a diagram of an example training process.

FIG. 5 is a diagram of an example training process. According to the example training process in diagram 500, a user may create a virtual character (VC), which may reside on a client device and/or a server (502). The virtual character's autonomic system may control basic simulated "biologic" functions (504). Simulated biologic functions may include a virtual biologic clock, the need for food, drink, going to bath, etc., which may require periodic attention of the user to take care of his/her virtual character during the growth phase (506). For example, the character may resemble a new born baby that requires periodic feeding, bathing, and cleanup.

The virtual character may also include a "brain" or artificial intelligence component(s) (512). The user may train the virtual character's brain by feeding data (e.g., answers to questions, images, voices, math, etc.) through the client device (514). User and others may play with the virtual character by feeding data and asking the virtual character to perform such as recognition of images, voices, etc. (516). In some embodiments, the virtual characters may play and compete with each other too (518).

The "brain" may be a set of A1 components and machine learning algorithms including deep learning algorithms (522). The user may allow other users (e.g., parents, teachers, peers) to train the virtual character (524). The trained brain may be a set of machine learning parameters and may be stored in a personalized memory space for each virtual character.

Figure 6:
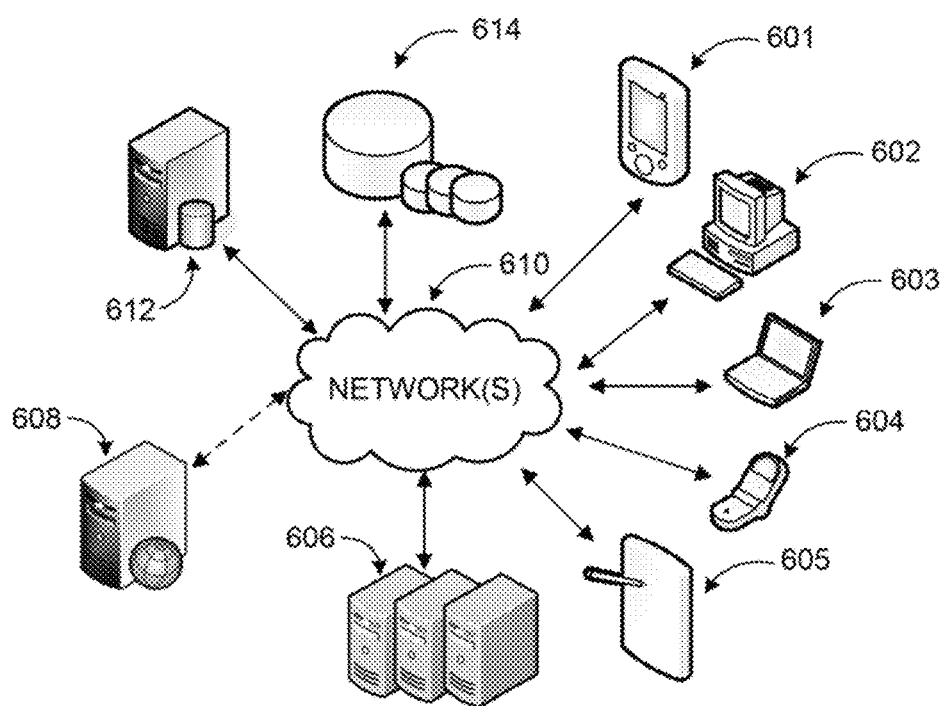
FIG. 6 is a networked environment, where a system according to embodiments may be implemented.

FIG. 6 is a networked environment, where a system according to embodiments may be implemented.

A virtual character development application as described herein may b executed in conjunction with hosted applications and services (for example, the virtual character development application 112, the artificial intelligence component 114, the virtual character memory 140, or the virtual biological clock 262) that may be implemented via software executed over one or more servers 606 or individual server 608, as illustrated in diagram 600. A hosted service or application may communicate with client applications on individual computing devices such as a handheld computer 601, a desktop computer 602, a laptop Computer 603, a smart phone 604, a tablet computer (or slate), 605 ('client devices') through network(s) 610 and control a user interface presented to risers.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network (s) 610 may include a secure network such as an enterprise network, an insecure network such as a wireless open network, or the Internet. Network(s) 610 may also coordinate communication over other networks such as PSTN or cellular networks. Network(s) 610 provides communication between the nodes described herein. By way of example, and not limitation network(s) 610 may include wireless media such as acoustic, RF, infrared and other wireless media.

Many other configurations of computing devices, applications, engines, data sources, and data distribution systems may be employed to execute a virtual character development application. Furthermore, the networked environments discussed in FIG. 6 are for illustration purposes only. Embodiments are not limited to the example applications, engines, or processes.

Figure 7:
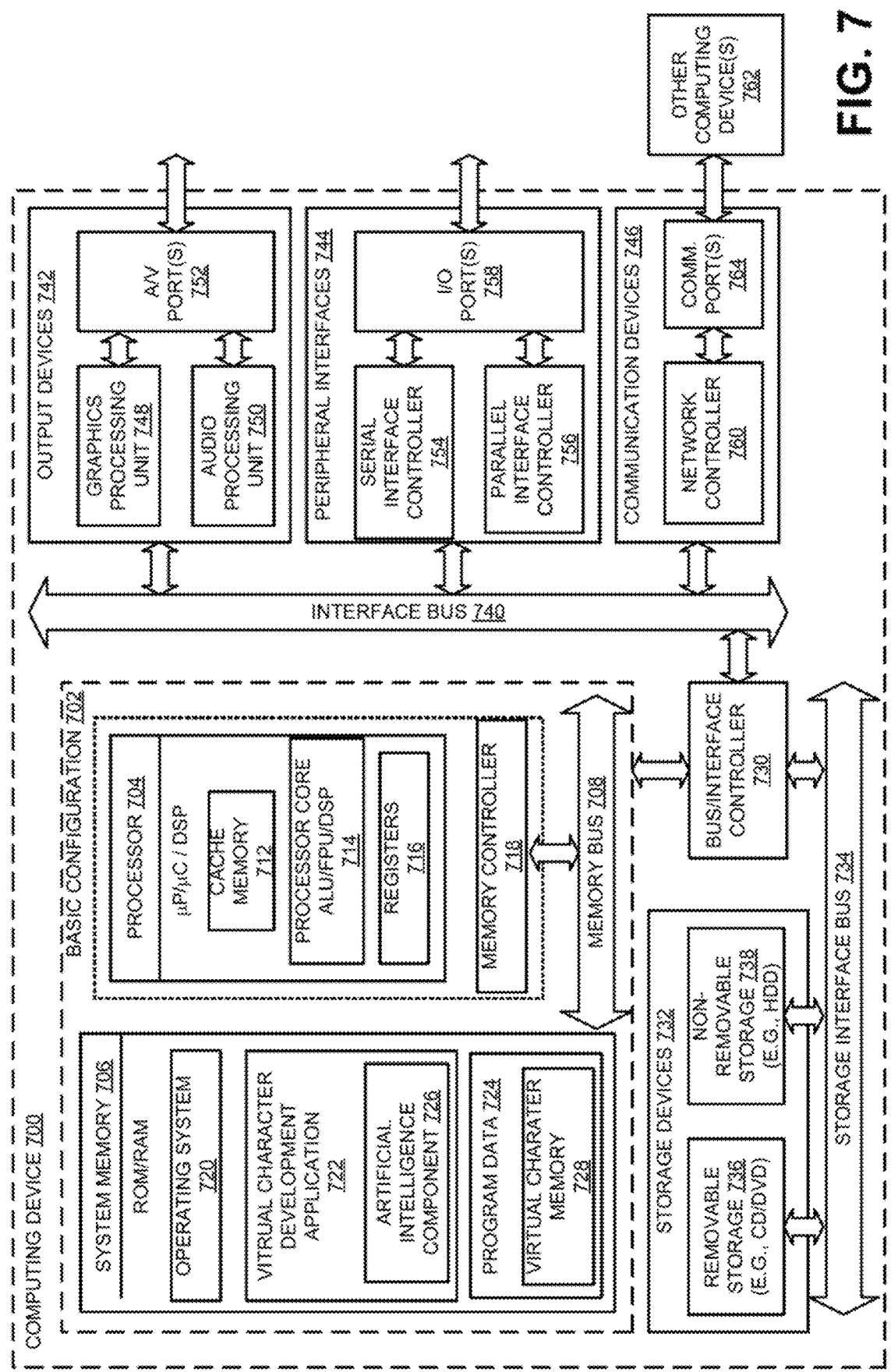
FIG. 7 illustrates a computing device, such as a server, which may be communicatively coupled to client device configured execute a virtual character development application.

FIG. 7 illustrates a computing device, such as a server, which may be communicatively coupled to an apparatus or system configured to execute a virtual character development application using machine learning, arranged in accordance with at least some embodiments described herein.

In an example basic configuration 702 the computing device 700 may include one or more processors 704 and a system memory 706. A memory bus 708 may be used to communicate between the processor 704 and the system memory 706. The basic configuration 702 is illustrated in FIG. 7 by those components within the inner dashed line.

Depending on the desired configuration, the processor 704 may be of any type, including but not limited to a microprocessor ($\mu P$), a microcontroller ($\mu C$), a digital signal processor (DSP), or any combination thereof. The processor 704 may include one or more levels of caching, such as a cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 70 may be of any type including but not limited to volatile memory (such as RAM), non-volatile memory (such as ROM, flash memory, etc.) or any combination thereof. The system memory 706 ma include an operating system 720, a virtual character development application 722, and program data 724. The virtual character development application 722 may include an artificial intelligence component 726. The artificial intelligence component 726 may process a user input and extract information using character recognition, voice recognition, or image recognition. The artificial intelligence component 726 may compare the extracted information to the stored memory of the associated virtual character and may update the virtual character's memory based on the extracted information. Program data 724 may include a virtual character memory 728. The virtual character memory 728 may include data associated with each virtual character and the information learned by the character.

The computing device 700 may have additional features or functionality, and additional interfaces to facilitate communications between the basic configuration 702 and an desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 744, and one or more communication devices 7463 to the basic configuration 702 via the bus/interface controller 740. Some of the example output devices 742 include a graphics processing unit 748 and an audio processing unit 770, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (e.g., keyboard, mouse, pen, voice input device, touch input device, etc.) or other peripheral devices (e.g., primer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport, mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations. GPUs may be used to implement the neural networks.

Figure 8:
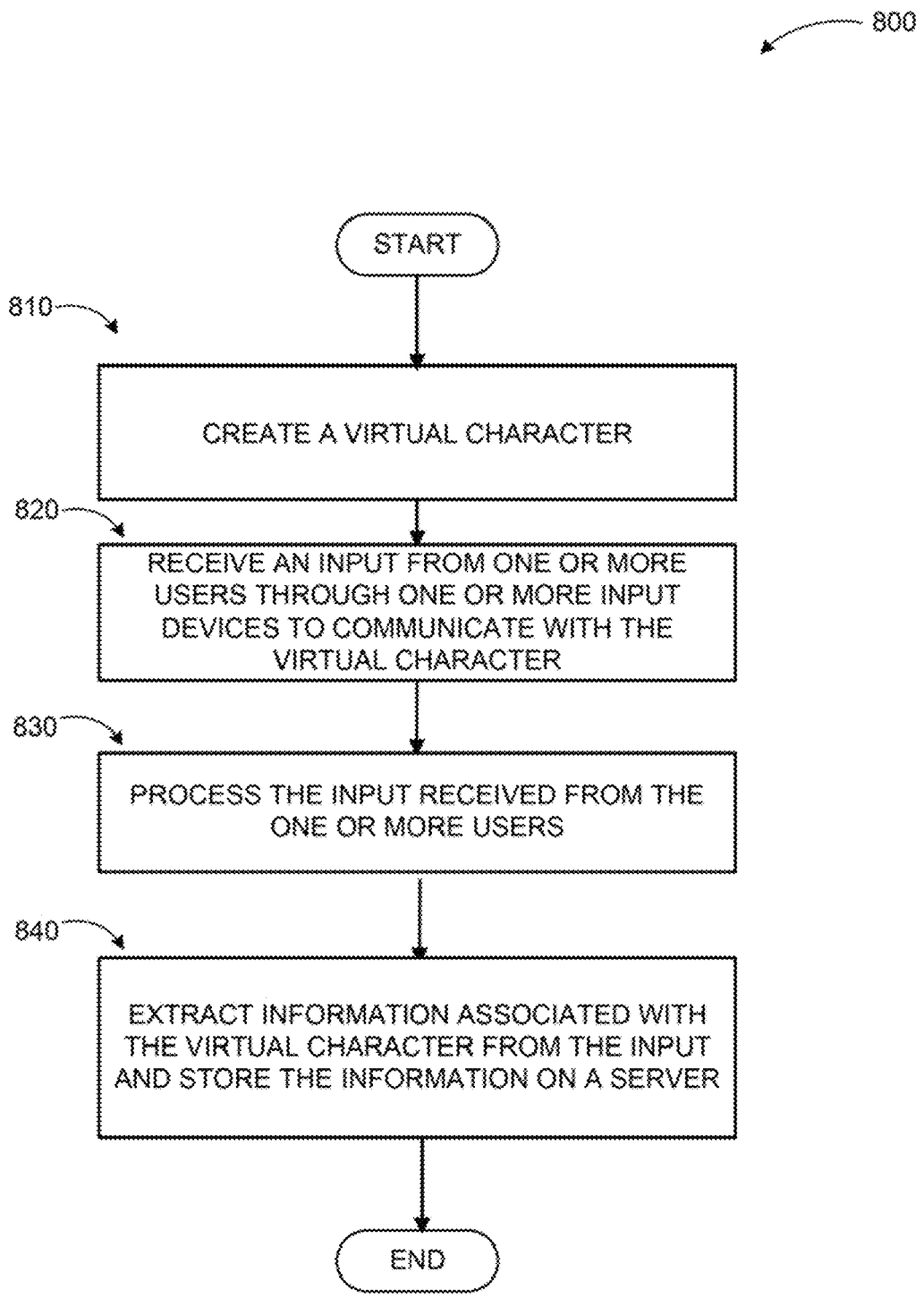
FIG. 8 is a flow diagram illustrating an example method to execute a virtual character development application that may be performed by an apparatus or system that includes a computing device such as the computing device in FIG. 7.

FIG. 8 is a flow diagram illustrating an example method to execute a virtual character development application that may be performed by an apparatus or system that includes a computing device such as the computing device in FIG. 5, arranged in accordance with at least some embodiments described herein.

Example methods may include one or more operations, functions or actions as illustrated by one or more of blocks 810, 820, 830, and 840, and may in some embodiments be performed by a computing device such as the computing device 700 in FIG. 7. Such operations, functions, or actions in FIG. 7 and in the other figures, in some embodiments, may be combined, eliminated, modified, and/or supplemented with other operations, functions or actions, and need not necessarily be performed in the exact sequence as shown.

An example process to execute a virtual character development application may begin with block 810, "CREATE A VIRTUAL CHARACTER", where a user may create a virtual character using a client device. The client device may execute a virtual character development application in conjunction with a server. Upon creation of the virtual character, the virtual character development application may prompt the user to select a role for the newly created virtual character and themselves. The virtual character development application may create a memory specific to the virtual character as well as a virtual biological clock.

Block 810 may be followed by block 820, "RECEIVE AN INPUT FROM ONE OR MORE USERS THROUGH ONE OR MORE INPUT DEVICES TO COMMUNICATE WITH THE VIRTUAL CHARACTER", where the user may enter an input in order to communicate with the virtual character. The user may enter the input using an audio capture component or device, an image capture component or device, or may upload media. The virtual character development application may provide the input to an artificial intelligence component to be processed.

Block 820 may be followed by block 830, "PROCESS THE INPUT RECEIVED FROM THE ONE OR MORE USERS", where the input may be processed by the artificial intelligence component using voice recognition, image recognition, or character recognition.

Block 830 may be followed by block 840) "EXTRACT INFORMATION ASSOCIATED WITH THE VIRTUAL CHARACTER FROM THE INPUT AND STORE THE INFORMATION ON A SERVER", where the artificial intelligence component may compare the extracted information with the virtual character's stored memory, may determine that the extracted information contains new information, and may update the virtual character's memory based on the determination.

The operations included in process 800 are for illustration purposes. Executing a virtual character development application may be implemented by similar processes with fewer or additional operations, as well as in different order of operations using the principles described herein. The operations described herein may be executed by one or more processors operated on one or more computing devices, one or more processor cores, specialized processing devices, and/or general-purpose processors, among other examples.

According to some embodiments, a system may be configured to execute an application for virtual character development. The system may comprise a server that includes an artificial intelligence (AI) component capable of machine learning and a client device configured to communicate with the server. The client device, in conjunction with the server, may be configured to allow a user to create a virtual character, store information associated with the virtual character at the server, and provide a user interface (UI) to allow the user to interact the virtual character through an input. The information associated with the virtual character may be provided to the AI component. The AI component may be configured to receive an input from a user associated with a virtual character, extract information from the received input, update the information associated with the virtual character based on the extracted information, and provide an interactive response to the input through the virtual character.

In other embodiments, the virtual character may include one of: a baby, a child, or a teenager. According to some embodiments, the client device may be further configured to prompt the user to select a role that includes one of: a child, a parent, a friend, or a teacher. In further embodiments, the input may include one of: a visual input, an audio input, a keyboard input, and a mouse input. In some embodiments, the client device may be configured to enable the user to communicate with the virtual character by generating the audio input using a microphone. In further embodiments, the client device may be further configured to enable the user to communicate with the virtual character by uploading one of: a text, an image, or a video from the client device. According to other embodiments, the client device may be further configured to enable the user to communicate with the virtual character by recording a sound or a scene using a camera. In some embodiments, the server may be configured to authorize another user to communicate with the virtual character and may be further configured to enable the other user to interact with the virtual character through a verbal communication, a video, or a text. In other embodiments, the AI component may extract information from the received input through one or more of: character recognition, voice recognition, or image recognition. In some embodiments, the information may be related to one of: music, songs, drawings, games, logics, problem-solving vocabulary, letters, numbers, or arithmetic operations.

According to other examples, a serer may be configured to execute a virtual character development application. The server comprising a communication interface configured to provide communication between the server and a plurality of client devices, a memory configured to store instructions associated with a virtual character development application, and one or more processors coupled to the communication interface and the memory. The processor may be configured to receive an input from a user associated with a virtual character, execute an artificial intelligence engine to extract information from the received input, update information associated with the virtual character based on the extracted information, and provide, to a client device, an interactive response to the input through the virtual character.

In some examples, the artificial intelligence engine may be configured to keep a virtual biological clock for the virtual character, and the virtual biological clock ma control simulation of one or more simulated biological needs for each virtual character. In other examples, the simulated biological needs may include one of: feeding, bathing, sleeping, learning, or entertaining. According to further examples, the one or more processors may enable a user to perform activities including feeding, bathing, sleeping, teaching, using a bathroom, or entertaining the virtual character. In some examples, the one or more processors may be further configured to determine an intelligence level of the virtual character and develop the virtual character according to its intelligence level. In other examples, the one or more processors may be further configured to allow a plurality of virtual characters to interact with each other based on instructions from one or more associated users.

According to further embodiments, a method of simulating a virtual character may comprise creating a virtual character through an application executed on a client device, receiving an input from a user through one or more input devices to communicate with the virtual character, executing an artificial intelligence engine to extract information from the received input, updating information associated with the virtual character based on the extracted information, and providing an interactive response to the input through the virtual character. In other embodiments, the method may further comprise allowing the user to purchase an activity, a good, or a service for the virtual character within a simulation.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate mars (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

In addition, the mechanisms of the subject matter described herein are capable of being distributed as a program product in a variety of forms, and an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive (SSD), etc.; and a transmission type medium such as a and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices at processes described herein may be integrated into a data processing system via a reasonable amount of experimentation. A data processing system may include one or more of a system unit housing, a video display device, a memory such as volatile and non-volatile memory processors such as microprocessors and digital signal processors, computational entities such as operating systems, drivers, graphical user interfaces, and applications programs, one or more interaction devices, such as a touch pad or screen, and/or control systems including feedback loops and control motors.

A data processing system may be implemented utilizing any suitable commercially available components, such as those found in data computing/communication author network computing/communication systems. The herein described, subject matter sometimes illustrates different components contained within, or connected with, different other components. Such depicted architectures are merely exemplary, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components, and/or wirelessly inter actable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no, such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and; "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A system configured to execute an application for virtual character (VC) development, the system comprising:
    a server that in an artificial intelligence (AI) component capable of machine learning; and
    a client device configured to communicate with the server, wherein the client device, in conjunction with the server, is configured to:
        provide a user interface (UI) to allow a user to create a VC; and
        allow a user to interact the VC through an input module, wherein information associated with the VC is stored at the server, and provided to the AI component,
    wherein the AI component of the server is configured to:
        perform training by:
            receiving an input from the user associated with the VC,
            training the VC, utilizing information extracted from the input, and
            updating a machine learning model associated with the VC based on the information extracted from the input; or
        perform inferencing by:
            responding to inquiries to the VC by the user or another person authorized by the user based on, processing by the trained machine learning model.

2. The system of claim 1, wherein the VC comprises an autonomic component and an artificial intelligent component, and wherein
   the autonomic component controls simulated biologic functions of the VC including need for water, food, or physical growth, and
   the artificial intelligent component controls an intelligence of the VC based on the machine learning model, and
   the artificial intelligence model is configured to be trained by the user or another authorized user.

3. The system of claim 1, wherein the AI component comprises a neural network.

4. The system of claim 1, wherein one or more parameters of the machine learning model are stored in a personalized space of the VC.

5. The system of claim 1, wherein the machine learning model is a recurrent neural network, a convolutional neural network, or a combination thereof.

6. The system of claim 1, wherein the client device is further configured to prompt the user to select a role that includes one of a child, a parent, a friend, or a teacher.

7. The system of claim 1, wherein the input includes one of: a visual input, an audio input, a keyboard input, and a mouse input.

8. The system of claim 7, wherein the client device is configured to enable the user to communicate with the VC by one or more of:
   generating the audio input using a microphone;
   uploading one of: a text, an image, or a video from: the client device; and
   recording a sound or a scene using a camera.

9. The system of claim 1, wherein the server is configured to authorize another user to. communicate with the VC through a verbal communication, a video, or a text.

10. The system of claim 1, wherein the AI component extracts information from the received input through one or more of character recognition, voice recognition, or image recognition.

11. The system of claim 10, wherein the information is related to one of: music, songs, drawings, games, logics, problem-solving skills, vocabulary, letters, numbers, or arithmetic operations.

12. A server configured to execute a virtual character (VC) development application, the server comprising:
   a communication interface configured to provide communication between the server and a plurality of client devices;
   a memory configured to store instructions associated with the VC development application; and
   a processor coupled to the communication interface and the memory, wherein the processor is configured to:
      provide a user interface (UI) through a client device to allow a user to create a VC;
      receive an input through the client device from the user; and
      execute an artificial intelligence (AI) component, wherein the AI component is configured to:
         extract information from the received input;
         train the VC, utilizing information extracted from the input; and
         update a machine learning model associated with the VC based on the information extracted from the input; or
         provide an interactive response to the input through the VC, wherein the VC comprises:
            an autonomic component configured to control simulated biologic functions of the VC including need for water, food, or physical growth, and
            an artificial intelligent component configured to control an intelligence of the VC based on the machine learning model and be trained by, the user or another authorized user.

13. The computing device of claim 12, wherein the autonomic component is configured to keep a virtual biological clock for the VC.

14. The computing device of claim 13, wherein the virtual biological clock controls simulation of one or more simulated biological needs for the VC.

15. The computing device of claim 14, wherein the simulated biological needs include one of:
   feeding, bathing, sleeping, learning, or entertaining.

16. The computing device of claim 12, wherein the AI component enables a user to perform activities including feeding, bathing, sleeping, teaching, using a bathroom or entertaining with the VC.

17. The computing device of claim 12, wherein the AI component is further configured to determine an intelligence level of the VC and develop the VC according to its intelligence level.

18. The computing device of claim 12, wherein the AI component is further configured to allow a plurality of VCs to interact with each other based on instructions from one or more associated users.

19. A method of simulating a virtual character (VC) comprising:
   creating a VC through an application executed on a client device;
   receiving an input from a user through one or more input devices to communicate with the VC;
   executing an artificial intelligence (AI) component to extract information from the received input;
   training the VC, utilizing information extracted from the input;
   updating a machine learning model associated with the VC based on the information extracted from the input; and
   providing an interactive response to the input through the VC.

20. The method of claim 19, further comprising
allowing the user to purchase an activity, a good, or a service for the VC within a simulation.

* * * * *